United States Patent [19]
Rigalt

[11] 3,914,734
[45] Oct. 21, 1975

[54] BRAKE FAILURE WARNING DEVICE

[76] Inventor: Gonzalo Rigalt, P.O. Box 126, Guatemala City, Guatemala

[22] Filed: May 2, 1973

[21] Appl. No.: 356,425

[52] U.S. Cl. ............... 340/52 A; 188/1 A; 200/61.4
[51] Int. Cl.² ........................................ B60T 17/22
[58] Field of Search ........ 340/52 A, 52 B; 200/61.4, 200/61.44; 188/1 A; 73/132

[56] References Cited
UNITED STATES PATENTS

| | | |
|---|---|---|
| 3,407,906 | 10/1968 | Lorenz .......................... 340/52 A |
| 3,479,640 | 11/1969 | Puma ............................... 340/52 |
| 3,674,114 | 7/1972 | Howard ........................ 340/52 A |
| 3,735,343 | 5/1973 | Lane et al. ..................... 340/52 A |

*Primary Examiner*—John W. Caldwell
*Assistant Examiner*—Joseph E. Nowicki
*Attorney, Agent, or Firm*—Stevens, Davis, Miller & Mosher

[57] ABSTRACT

A brake failure warning device including an electrically conductive leaf spring which is spaced apart from an arcuate portion of the brake shoe and has one end biased towards the shoe. Connected to the one end of the leaf spring is a conductive plate, also spaced apart from the shoe, and a pin extending from the plate through the shoe a predetermined distance into the brake lining. The other end of the leaf spring is connected to, but electrically insulated from, the shoe via a non-conductive block. The leaf spring is electrically connected to an ignition switch and an alarm indicator located on the dashboard of a vehicle. When the brake lining has worn beyond the extension of the pin, the biasing force of the leaf spring urges the plate into contact with the shoe, thereby closing a circuit when the ignition switch is turned on to provide a brake failure warning signal. In an alternative embodiment, the pin is also made of a conductive material so that a second or back-up circuit is made through contact between the pin and the brake drum when the ignition switch is turned on.

7 Claims, 4 Drawing Figures

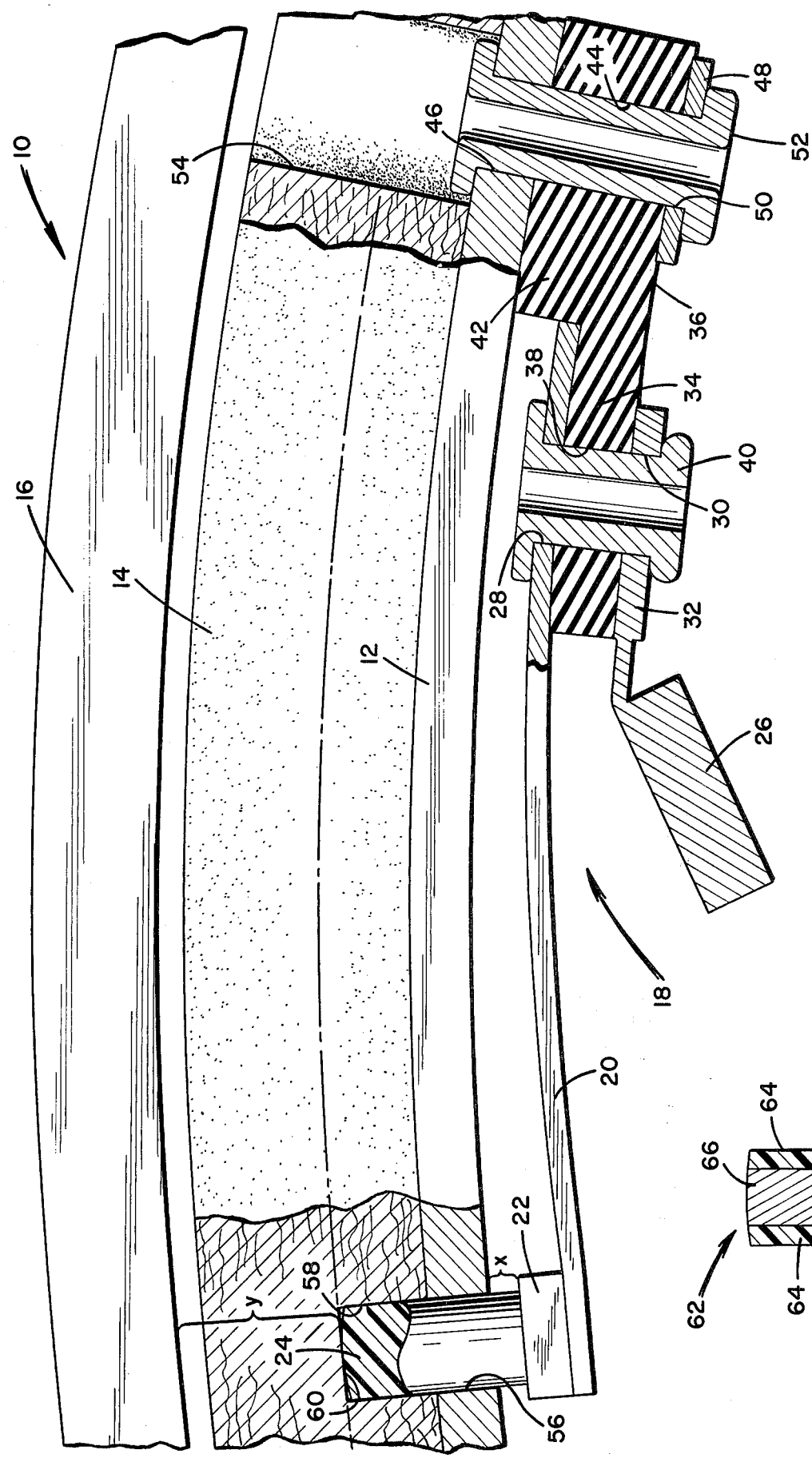

BRAKE FAILURE WARNING DEVICE

BACKGROUND OF THE INVENTION

This invention relates to a brake failure warning device and, more particularly, to a device for indicating the condition of the brake linings without requiring visual examination of the brakes.

Safe driving requires that the brake linings be in good condition so as to ensure a satisfactory braking action. However, the wear rate of the brake linings varies depending on several factors including the manner in which the vehicle is driven, thereby making it difficult to estimate without examination the condition of the linings. Therefore, periodic time consuming and expensive inspections are needed, even though the linings may be satisfactory, since the brakes cannot be examined without removing the wheels and brake housings.

As a result, brake failure warning detectors have been developed which inform the driver of the condition of the linings. These detectors include apparatus that sense when the linings have worn to a point where replacement is necessary and then signal the driver, via an alarm on the dashboard of the vehicle, of this fact. With such detectors, therefore, periodic brake inspections are unnecessary and the driver is assured that the linings are adequate.

Such known detectors are generally complex in design and operation, and are expensive to manufacture. In addition, many of these detectors require that the brake pedal be depressed before a circuit is closed to activate an alarm. Since the brake pedal is usually not depressed until after the vehicle is in motion, the delay until such time before a warning signal can be given is not very satisfactory.

The present invention, on the other hand, provides a brake failure warning device which has few parts, is simple in operation and inexpensive to make. Furthermore, this invention may be easily installed either at the factory when the vehicle is built, or by a user after it has been delivered.

Also, in accordance with the present invention, when the brake linings are in need of replacement the driver of the vehicle is given a warning signal the moment the ignition switch is turned on without requiring the brake pedal to be depressed. In addition, in an alternative embodiment, a simple back-up or safety circuit is included for providing the alarm signal.

SUMMARY OF THE INVENTION

A conductive leaf spring is spaced apart from an arcuate portion of the brake shoe and biased at one end towards the brake lining. At the one end the leaf spring has connected thereto a conductive plate, which is also spaced apart from the shoe, and a non-conductive pin that extends from the conductive plate through the brake shoe a predetermined distance within the brake lining. The other end of the leaf spring is electrically insulated from, but connected to, the shoe through a non-conductive block.

When the brake lining has worn to the tip of the pin, there is no longer any force exerted on the pin in opposition to the biasing force of the spring. The leaf spring then moves the pin towards the brake drum thereby causing the conductive plate to abut the brake shoe. A circuit will then be closed through the brake shoe, conductive plate, conductive leaf spring, an alarm indicator on the dashboard of the vehicle and the vehicle battery when the ignition switch is turned on to provide a brake failure warning signal.

In an alternative embodiment, the pin is also made conductive so that when the brake lining has worn to the tip of the pin, parallel circuits will be closed through contact between the conductive pin and brake drum, as well as the conductive plate and brake shoe, thereby providing a back-up circuit for giving an alarm signal.

BRIEF DESCRIPTION OF THE DRAWINGS

FIG. 1 illustrates an enlarged, fragmentary, side elevation of a drum brake including the brake failure warning device of the present invention which is shown in longitudinal section.

FIG. 2 depicts, in cross-section, a conductive pin which may be used in an alternative embodiment of this invention.

DETAILED DESCRIPTION OF THE DRAWINGS

Figure 3:
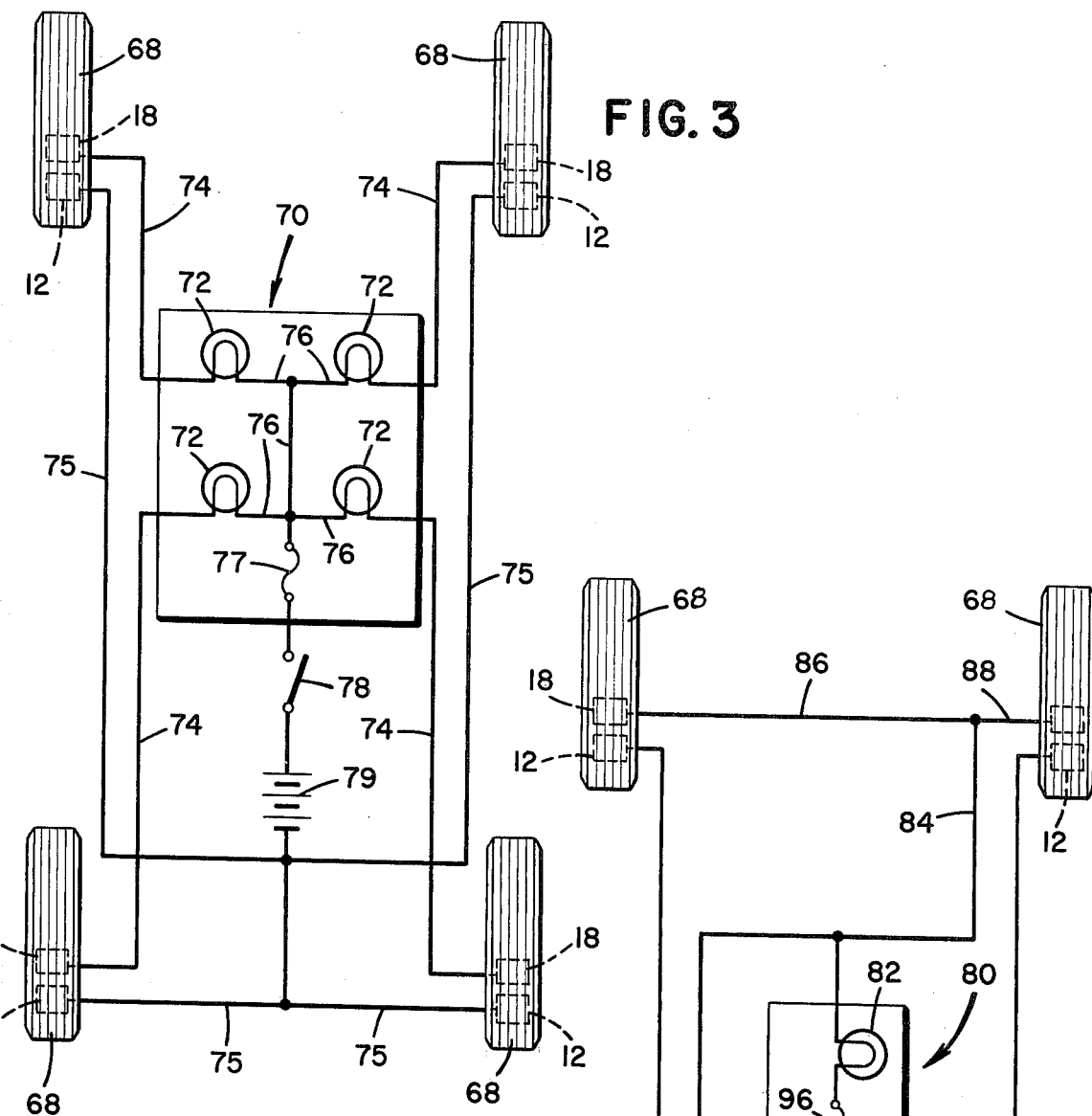
FIG. 3 is a schematic wiring diagram for indicating brake failure on individual wheels.

In FIG. 1 there is shown part of a conventional brake used on, for example, an automobile. The brake 10 includes a brake shoe 12 having mounted thereon a brake lining 14. The brake 10 is shown with the brake pedal released and, therefore, the brake drum 16 is spaced apart from the lining 12.

Mounted on an arcuate portion of the brake shoe 12 is the brake failure warning device of the present invention shown generally at 18. The device includes a conductive leaf spring 20, conductive plate 22, non-conductive pin 24 and an electrical terminal 26 connected to the brake shoe 12 in the following manner. One end of leaf spring 20 has an aperture 28 in alignment with an aperture 30 located on terminal extension 32 of the terminal 26. Positioned between the one end of leaf spring 20 and terminal extension 32 is a relatively thin section 34 of a non-conductive block 36. Section 34 includes an aperture 38 therethrough which is aligned with apertures 28 and 30. A conductive rivet 40 extending through the apertures 28, 30 and 38 joins leaf spring 20, terminal extension 32 and section 34.

A relatively thick section 42 of non-conductive block 36 has one side mounted on an inside portion of brake shoe 12. Section 42 includes an aperture 44 therethrough which is aligned with aperture 46 extending through shoe 12. A flat washer 48, located on the other side of section 42, has an aperture 50 therethrough which is in alignment with apertures 44 and 46. A rivet 52 extends through apertures 44, 46 and 50 to fixedly mount section 42 to brake shoe 12. As shown, brake lining 14 has a hole 54 through which rivet 52 may pass to connect section 42 with brake shoe 12.

It is important to prevent conductive rivet 40 from contacting brake shoe 12 in order to avoid generating a faulty brake failure warning signal. Such undesirable contact may be checked by making non-conductive block 36 from a non-flexible fiber and tightly securing section 42 to the shoe 12 so as not to permit block 36 to move. In addition, the leaf spring should be biased to exercise pressure on plate 22 and pin 24, but not be biased so as to break or bend block 36.

The conductive plate 22 is secured in any conventional manner to the other end of leaf spring 20. Non-conductive pin 24 is also secured to plate 22 and extends through an aperture 56 in brake shoe 12 into the brake lining 14. Pin 24 projects into brake lining 14 a predetermined distance set by the length of aperture 58 that extends only part way through the lining. Aperture 56 has a width which is smaller than the width of plate 22 to ensure that the latter will make contact with brake shoe 12, as will be described. A small clearance is also maintained between pin 24 and apertures 56 and 58 to enable pin 24 to slidably fit within these apertures.

The operation of the present brake failure warning device will now be described. FIG. 1 illustrates, by the full lines, part of a brake (with the brake pedal released) having a brake lining 14 that has not worn to any appreciable degree and, therefore, is in good condition. Leaf spring 20 biases plate 22 and pin 24 towards brake drum 16; however, this biasing force is opposed by the force exerted on the tip of pin 24 where it is in contact with wall 60 of aperture 58. As a result, conductive plate 22 is spaced apart from brake shoe 12, as shown, and no electrical circuit, described hereinafter, is closed to give a brake failure warning signal.

When the brake lining 14 has worn to a thickness substantially equal to the length by which pin 24 projects into the lining, as shown by the dashed lines in FIG. 1, there will be no opposing force on pin 24 to counteract the biasing force of leaf spring 20. Therefore, with the brake pedal released, leaf spring 20 will force pin 24 to slide within apertures 56 and 58 and cause plate 22 to contact brake shoe 12. This assumes, of course, that the distance $x$, shown in FIG. 1, between plate 22 and brake shoe 12 is less than or equal to the distance $y$ between pin 24 and brake drum 16. If the distance $y$ was less than $x$, pin 24 would abut drum 16 and plate 22 would not be able to contact shoe 12 since the biasing force of spring 20 could not overcome the opposing force provided by drum 16 on pin 24. When plate 22 touches shoe 12, and when the ignition switch of the vehicle is turned on, a circuit is closed through brake shoe 12, conductive plate 22, conductive leaf spring 20, metal rivet 40, terminal extension 32, terminal 26, the battery of the vehicle and an alarm indicator (see FIGS. 3 and 4) located on the dashboard of the vehicle. The alarm indicator may then provide a visual or other signal indicating that the brake lining has worn to a condition where replacement may be required.

The urgency with which the brake lining 14 needs to be replaced is determined by the initial depth of the pin 24 within the lining. For example, the greater the penetration of pin 24, the more brake lining will be present when the alarm signal is given for the first time. Thus, there will be a sufficient amount of brake lining remaining to allow the vehicle to be driven a prudent number of miles before its replacement is mandatory.

As already indicated, a brake failure warning signal will be given without depressing the brake pedal. However, with the brakes being applied when the brake lining has worn to the degree shown by the dashed lines, or thinner, pin 24 will contact brake drum 16. Pin 24 will also touch drum 16 if the distance $x$ equals $y$, as mentioned above, even with the pedal released. Therefore, to prevent marring of the brake drum 16, pin 24 should be made of a non-abrasive, non-electrically conductive material such as phenolic fiber.

In an alternative embodiment, a back-up or safety circuit may be used for generating the alarm signal. The structure of the back-up circuit is the same as that already described, except that the pin 62 shown in FIG. 2 is used in place of non-conductive pin 24. Pin 62 includes a non-abrasive, non-electrically conductive outer section 64 and a soft, electrically conductive inner section 66 extending lengthwise through section 64. For example, section 64 may be made of phenolic fiber while section 66 may be made of aluminum, copper or other soft metal. In the alternative, carbon can be used for section 66 with a covering of any insulating material for section 64. Furthermore, section 66 should extend through section 64 with both ends of the former being exposed in order to close the electrical circuit when pin 62 contacts drum 16. The outer section 64 may comprise a hollow pin into which is inserted, by force fit, a conductive pin comprising inner section 66. In addition, for reasons which will become apparent from the following discussion, in this back-up circuit the distances $x$ and $y$ mentioned previously should be equal.

The back-up circuit operates in the following manner when the brake lining 14 has worn to a thickness corresponding to the initial penetration of pin 62. At such time, and with the brake pedal released, leaf spring 20 will urge plate 22 against shoe 12 while pin 62 abuts drum 16. With plate 22 and pin 62 touching, respectively, shoe 12 and drum 16, two parallel, electrical circuits will be made when the ignition switch is turned on. The first circuit is completed through shoe 12, conductive plate 22, conductive leaf spring 20, rivet 40, terminal extension 32, terminal 26, the vehicle battery and the alarm indicator. The second circuit is completed through drum 16, conductive layer 66, plate 22, leaf spring 20, rivet 40, terminal extension 32, terminal 26, the battery and the alarm indicator. Thus, if for any reason the first circuit is not closed through shoe 12 and plate 22, the second circuit will provide the brake failure warning signal.

The back-up circuit also serves the function of generating an alarm signal even when the brake pedal is depressed. With the lining in a worn condition beyond the dashed lines of FIG. 1, after the pin 62 contacts drum 16 the shoe will continue to be depressed until lining 14 touches the drum. As a result, plate 22 will be disconnected from shoe 12 thereby opening the first circuit. However, the second circuit mentioned above will be made through contact between pin 62 and drum 16 (with the ignition switch on).

FIG. 3 shows schematically a wiring diagram for indicating the condition of the brakes for each wheel. In this circuit, the brake failure warning apparatus of FIG. 1 is connected to the brake shoe of each of the four wheels. A brake failure warning alarm indicator 70 is shown as having four warning lights 72 associated, respectively, with each wheel 68 and may be located on the dashboard of a vehicle. Each warning light 72 is electrically connected through one of its terminals to the respective terminal 26 (see FIG. 1) via a conductive wire 74. The other terminal of each light 72 is electrically connected via wires shown generally at 76 through a fuse 77 to the ignition switch 78 and battery 79 with the latter also being connected to each shoe 12 and drum 16 (if the back-up circuit is employed) through wires 75. When the ignition switch is closed, one or more lights 72 will turn on should a respective brake lining be in need of replacement.

Figure 4:
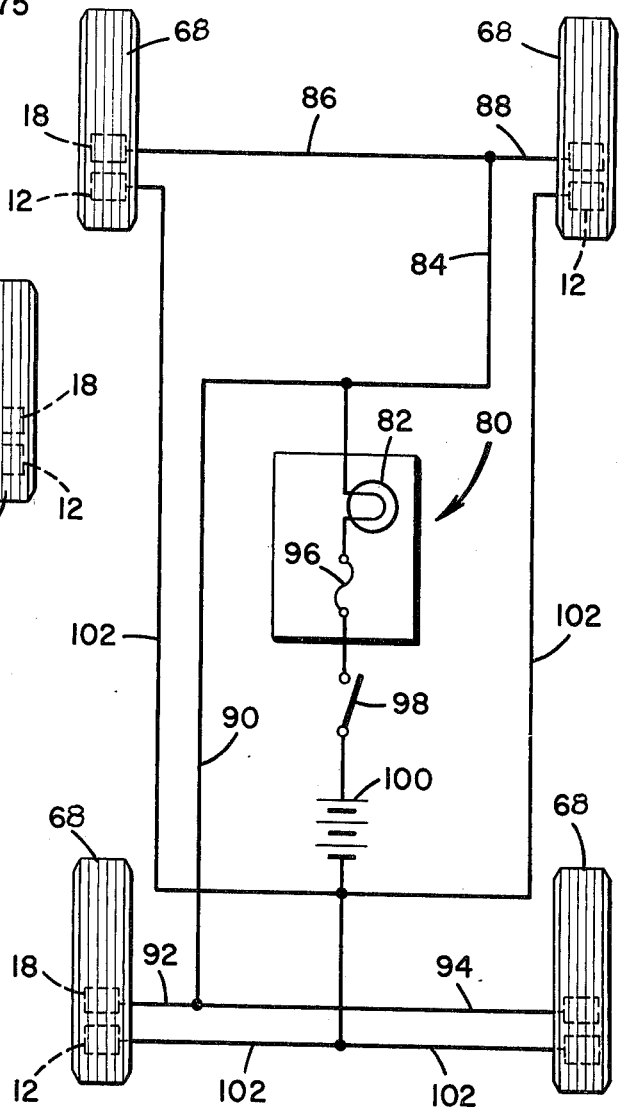
FIG. 4 shows schematically a wiring diagram for signaling brake failure without indicating the particular brake whose lining may need replacement.

FIG. 4 illustrates a schematic wiring diagram in which a brake failure warning signal is generated, but without indicating the particular wheel having a brake lining that may need replacement. The brake failure warning alarm indicator 80 comprises a single light 82. The light 82 is connected at one of its terminals to each of the terminals 26 located on front wheels 68 via wires 84, 86 and 84, 88, respectively. The one terminal of light 82 is also connected to the terminals 26 of the rear wheels through wires 90, 92 and 90, 94. The other terminal of light 80 is coupled through fuse 96 to the ignition switch 98 and battery 100 with the latter being connected to each shoe 12 and drum 16 through wires 102 as indicated above. When the ignition switch is closed, light 82 will turn on should one or more of the brake linings need replacement.

What is claimed is:

1. A brake lining wear detector for a brake including an electrically conductive brake shoe and brake drum comprising:
   a. an electrically conductive leaf spring spaced apart from said brake shoe, said leaf spring being biased at one end towards said shoe;
   b. means for connecting the other end of said leaf spring to a first arcuate portion of said shoe, said connecting means electrically insulating said other end from said first portion;
   c. an electrically conductive plate connected to said one end of said leaf spring, said plate being mounted on the side of said spring facing said brake shoe and being spaced apart from said shoe;
   d. a pin connected to said conductive plate, said pin extending through an aperture in a second arcuate portion of said brake shoe a predetermined distance into the brake lining, said pin being slidable within the brake lining and spaced apart from said drum; and
   e. first means coupled to said brake shoe, said plate and said leaf spring for providing a brake lining wear signal when said plate contacts said brake shoe.

2. The wear detector of claim 1 wherein said pin is made of an electrically conductive material.

3. The wear detector of claim 2 wherein the spaced apart distance between said conductive plate and said brake shoe is equal to said spaced apart distance between said conductive pin and said brake drum.

4. The wear detector of claim 3 further comprising second means coupled to said conductive pin, said conductive brake drum and said conductive spring for providing a brake lining wear signal when said conductive pin contacts said brake drum.

5. The wear detector of claim 4 wherein said conductive pin comprises an inner section of an electrically conductive material and an outer section of an electrically non-conductive material, said inner section extending longitudinally through said outer section.

6. The apparatus of claim 1 wherein the brake lining wear detector is connected to a plurality of wheels and said first means includes means for signaling the wear condition for each respective brake lining.

7. The apparatus of claim 1 wherein the brake lining wear detector is connected to a plurality of wheels and said first means includes means, common to all the wheels, for signaling the wear condition of the brake linings.

* * * * *